United States Patent [19]

Misek et al.

[11] 4,198,623

[45] Apr. 15, 1980

[54] TOUCH ENTRY INTERACTIVE CATHODE RAY TUBE ARRANGEMENT

[75] Inventors: Victor A. Misek, Hudson, N.H.; Albin A. Hastbacka, Chelmsford, Mass.; Robert J. Beairsto, Pembroke; Alphonse J. Trasatti, Amherst, both of N.H.

[73] Assignee: Sanders Associates, Inc., Nashua, N.H.

[21] Appl. No.: 960,142

[22] Filed: Nov. 13, 1978

[51] Int. Cl.² .............................................. G08C 21/00
[52] U.S. Cl. .................................. 340/365 P; 178/18; 250/578; 340/712
[58] Field of Search .............. 340/365 P, 712; 178/18; 250/203 CT, 549, 548; 364/742, 855

[56] References Cited

U.S. PATENT DOCUMENTS

| | | | |
|---|---|---|---|
| 3,047,723 | 7/1962 | Knapp | 250/578 X |
| 3,441,722 | 4/1969 | Gloess | 178/18 X |
| 3,478,220 | 11/1969 | Milroy | 340/365 P |
| 3,673,327 | 6/1972 | Johnson et al. | 340/712 X |
| 3,707,715 | 12/1972 | Perotto | 340/712 X |
| 3,860,754 | 1/1975 | Johnson et al. | 178/18 |
| 4,053,773 | 10/1977 | Deresh et al. | 250/578 X |

Primary Examiner—David L. Trafton
Attorney, Agent, or Firm—Louis Etlinger; Joseph E. Funk

[57] ABSTRACT

A display employing a horizontal and vertical grid of parallel infrared light beams in front of a cathode ray tube (CRT) face wherein a finger or other object may be placed against the face of the CRT to mark a spot thereon and the spot so marked will be detected by the interrupted beams. Infrared sources and detectors are located around the periphery of the CRT face and operate in different planes to more closely follow the curvature of the CRT face and thereby minimize parallax errors.

7 Claims, 5 Drawing Figures

TOUCH ENTRY INTERACTIVE CATHODE RAY TUBE ARRANGEMENT

FIELD OF INVENTION

This invention relates to interactive cathode ray tube (CRT) displays and more particularly to apparatus for indicating a point on the face of the CRT.

BACKGROUND OF THE INVENTION

The use of CRT video display terminals as interfaces to computers has expanded rapidly in the past decade. Keyboards, light pens, joy sticks, and other devices have been used in conjunction with these video display terminals to allow the operator to interface with a host computer in order to enter, edit and select information, prepare engineering designs and many other applications which are too numerous to list. All these interactive video display terminal applications require a physical element such as the keyboards, light pens and joy sticks mentioned above to provide the interaction, but these devices may be cumbersome or otherwise undesirable depending upon specific applications.

Accordingly, in many applications it has been found desirable to provide an arrangement whereby a display operator may interface with a host computer by merely touching the face of the CRT with a finger or other object. This requires sensor arrangements that can accurately determine the point on the face of a CRT that is being touched by a finger.

An arrangement in the prior art for providing this feature utilizes a matrix of intersecting light beams which are all located in one plane in front of a CRT face. However, in the industry, curved face CRTs are used very widely to minimize focus and other problems inherent to flat face CRTs. With curved face CRTs and beams lying in one plane, parallax problems arise which have been objectionable enough that light beam techniques have never been accepted in the industry. With a curved face CRT a light beam is close to the CRT face at the middle of the display area but is spaced further from the face nearer the edges of the screen. Due to parallax caused by this spacing finger or other object not oriented vertically to the CRT face then interrupts a light beam not related to the spot on the screen being touched. This causes operational errors. Accordingly, the use of intersecting light beams has never been accepted in the industry.

Thus, there still exists a need in the art for an arrangement whereby a person may interact with a computer without special equipment such as light pens and without having errors due to factors such as parallax.

SUMMARY OF THE INVENTION

In accordance with the teaching of our invention we provide a curved face CRT display coupled to a computer and the equipment operator may interact with the computer by merely touching the face of the CRT with, for example, a finger to perform many functions limited only by the imagination of the programmer who writes the operational software for the system.

Our invention utilizes infrared light sources mounted around the edges of and located close to the curved CRT face. The beam from each source along an edge lies in a first plane and is adjusted to be tangent to but not touching the face of the screen on a first half of the CRT face closest to the last mentioned edge. It can be recognized that these same beams pass further and further from a convex CRT face as they pass over the half of the CRT face furthest from the last mentioned edge. This increasing spacing of the beams from a curved CRT face causes a bad parallax problem which has never been solved. To solve this problem we provide infrared light sources along the opposite edge of the CRT face adjacent the second half of the screen. The beams from the last named sources only pass tangent to the screen over the second half of the screen. Thus, each beam is relatively close to one half of the face of the CRT. This is repeated for the remaining two edges of the screen.

As the face of the CRT is touched, two horizontal beams are interrupted, one close to the CRT face and the other spaced from the CRT face. At the same time two vertical beams are interrupted one close to and one spaced from the CRT face. A programmed microprocessor then utilizes the addresses of the interrupted vertical beams to determine which horizontal interrupted beam is closest to the CRT face at the point touched and the other horizontal interrupted beam is ignored. The same process is repeated utilizing the addresses of the interrupted horizontal beams to determine which interrupted vertical beam is closest to the CRT face at the point touched. The other interrupted vertical beam is ignored. Using the addresses of the interrupted horizontal and vertical beams closest to the CRT face at the point touched, the microprocessor accurately identifies the point being touched despite the finger or other object not being vertical to the face of the screen.

Our invention will become more apparent upon reading the following detailed description in conjunction with the drawing in which.

DETAILED DESCRIPTION

In accordance with the teaching of our invention, we utilize parallel vertical and parallel horizontal infrared light beams but no parallax problems occur with a curved CRT face. To achieve this goal we utilize a multiplicity of infrared sources (Light Emitting Diodes) located around the periphery of the CRT face and we also utilize a like multiplicity of infrared detectors also located around the periphery of the CRT face. These infrared sources (LEDs) and detectors cooperate in pairs.

Figure 1:
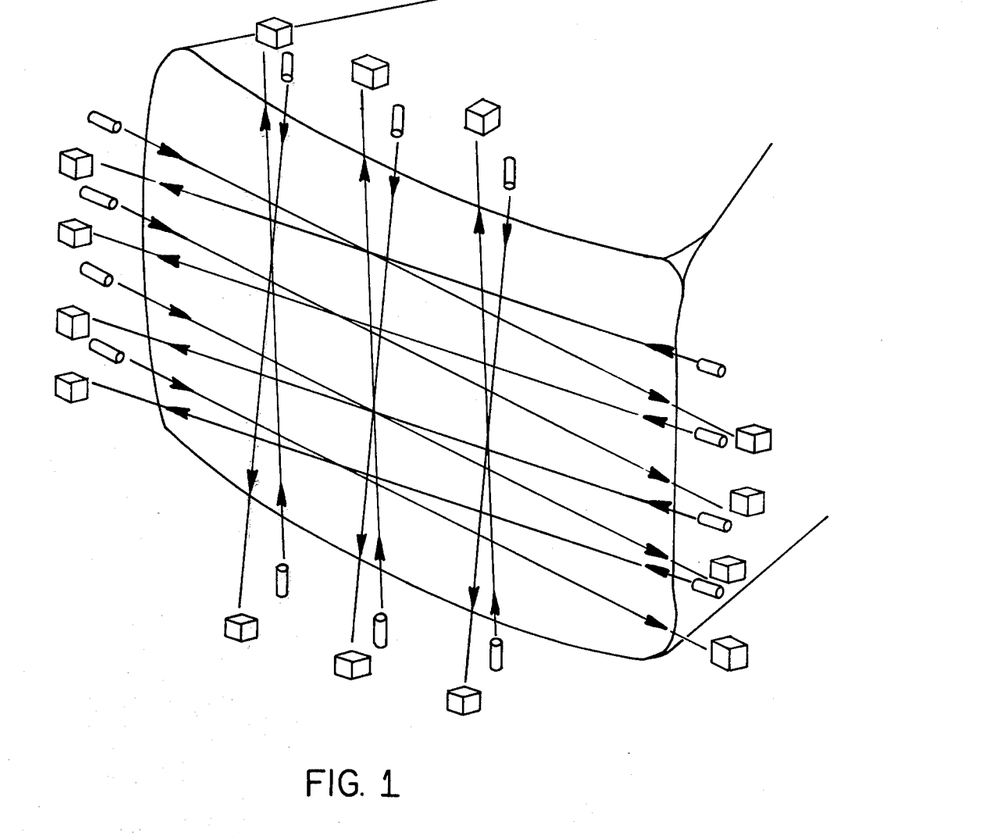
FIG. 1 shows the spatial relationship of infrared sources spaced around a CRT with respect to the curved face thereof.
Figure 2:
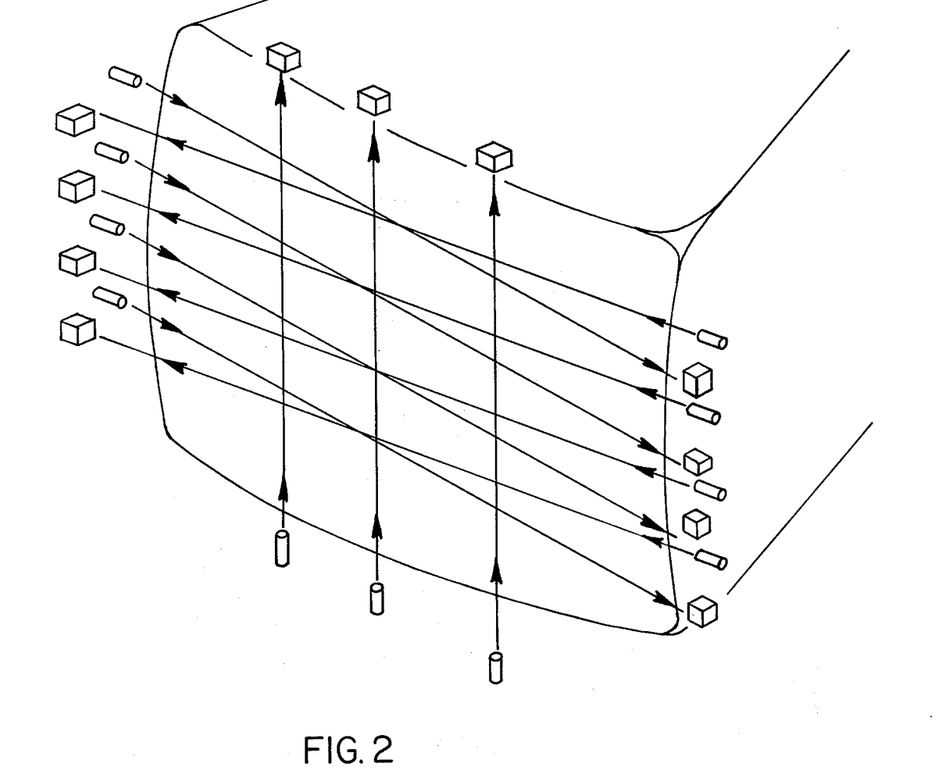
FIG. 2 shows the spatial relationship of infrared sources spaced around three of four sides of a curved face CRT as is described herein as the preferred embodiment of the invention.

On each of the four sides of a rectangular face CRT, the infrared sources are located close to the CRT face and are spaced along the side of the tube. The beams from the last named sources are parallel to each other and are coplanar. With the infrared sources being close to the CRT face their beams are tangent to but not touching the half of the CRT face closest to these sources. This orientation is seen in FIGS. 1 and 2 of the drawing. As may also be seen in FIGS. 1 and 2 the beams are spaced further from the screen as they pass over the half of the convex CRT face furthest from the particular infrared sources. As these beams pass over the furthest half of the screen the beams are spaced from the screen by an amount depending on the face curvature of the particular CRT utilized.

It should be noted in FIGS. 1 and 2 that the infrared sources on the remaining two opposing sides of the CRT face are similarly oriented and the previous discussion also applies thereto. The result, as may be seen in FIGS. 1 and 2, is that the planes in which the infrared beams lie on opposing sides of the rectangular CRT face are not coplanar.

The infrared detectors which detect the presence of an infrared beam from a corresponding one of the infrared sources are necessarily spaced from the CRT face as shown in FIGS. 1 and 2 in order to intercept the beam.

As is obvious after understanding the physical non-coplanar orientation of the infrared light beams originating from more than one side of the CRT face, a finger or other object touching the face of the CRT must interrupt more than one infrared beam. For beams originating from two opposing sides of the CRT screen a finger will interrupt one beam close to the CRT face and one beam spaced from the CRT face. This will also occur for two beams originating from the remaining two opposing sides of the CRT screen face. Thus, a maximum of four beams are interrupted. In the embodiment of our invention disclosed herein in detail, however, infrared sources are only located on the left, bottom and right sides of the CRT screen as shown in FIG. 2. Accordingly, infrared detectors are located on the left, top and right sides of the CRT screen. It was chosen to put the vertical oriented detectors on the top to minimize ambient light effects on these detectors.

With this preferred embodiment a finger or other object touching the screen will interrupt three infrared beams; two horizontal oriented non-coplanar beams, one of which lies close to the face of the CRT and the other of which is spaced from the face of the CRT at the point touched, and one vertical beam passing over the point touched and tangent to the center of the CRT face. It can easily be recognized that parallax problems will most likely occur with reference to the interrupted horizontal beam that is spaced furthest from the CRT face. In accordance with the teaching of our invention our novel equipment detects and identifies the interrupted vertical and two horizontal beams and then determines which horizontal beam is spaced farthest from the face of the CRT. It is the farthest spaced interrupted beam that is then ignored to minimize the parallax problem. The identification of the intercepted horizontal beam closest to the CRT face is used to indicate the vertical coordinate of the point on the CRT face that is being touched.

As described previously, two vertical beams may be utilized and, in the manner just described for two horizontal beams, the horizontal coordinate of the point on the CRT face being touched is determined. However, as further described, in the embodiment of our invention described herein infrared sources are only located along the bottom edge of the CRT screen with corresponding infrared detectors being located along the top edge of the screen. This embodiment allows for increased parallax but this is deemed acceptable in the particular application as horizontal rows of alpha-numeric characters are marked with a finger rather than individual points on the CRT face. If finer horizontal resolution is required, infrared sources should be located at both the top and bottom of the screen.

In the embodiment disclosed herein sixty-four collimated infrared sources are described for ease of representation. The exact number utilized may vary and a greater number are to be used for finer resolution of the point on the CRT face being touched. Twenty collimated infrared sources are located along each of the left and right hand edges of the screen and twenty-four sources are located along the bottom edge, with the sources along each edge being equispaced. As previously described, the sources are located near the CRT face as shown in FIG. 2 and the beams from all sources along each edge of the CRT face are parallel to each other and lie in the same plane. However, due to the curved face of the CRT, the beams originating from each edge of the CRT face are coplanar but each plane is non-coplanar with the other planes.

The infrared sources are then sequentially and periodically energized by circuitry described hereinafter and the output of the corresponding ones of the infrared detectors is sampled to determine which beams are broken by a finger or other object touching the face of the CRT. As all sixty-four sources are sequentially energized there will correspondingly be sequential outputs from three infrared detectors. Each infrared source is energized for one-half millisecond within a one millisecond period so each infrared source is energized once every sixty-four milliseconds.

The sequential and periodic scanning of the infrared sources is controlled by oscillator/clock driven digital circuitry and the clock time when a detector determines its corresponding beam has been broken indicates a horizontal or vertical coordinate of the point on the CRT face being touched by a finger. These last mentioned clock times are then processed by a microprocessor and a specific point or a row of information on the CRT face is highlighted to indicate the finger marked point, information, or command to be executed.

The clock count of an interrupted vertical infrared beam indicates to the microprocessor whether the point is on the left half or the right half of the CRT screen. The microprocessor knows from the interrupted infrared beam clock counts which horizontal beam originates from the left hand edge of the screen and which beam originates from the right hand edge of the screen. The microprocessor then selects the horizontal beam originating from the side of the screen corresponding to the interrupted vertical beam. The selected horizontal beam is the one close to the CRT face so vertical parallax is minimized. The horizontal beam spaced furthest from the CRT face is rejected as it would cause unacceptable parallax.

The clock count of the selected horizontal beam and the clock count of the broken vertical beam respectively indicate the vertical and horizontal coordinates of the point being touched by a finger. The microprocessor, which also generates the signals for the information being displayed, then causes the touched point or row of characters, etc. to be highlighted. The microprocessor will also perform other functions if the touched point indicates a command to the microprocessor.

Figure 3:
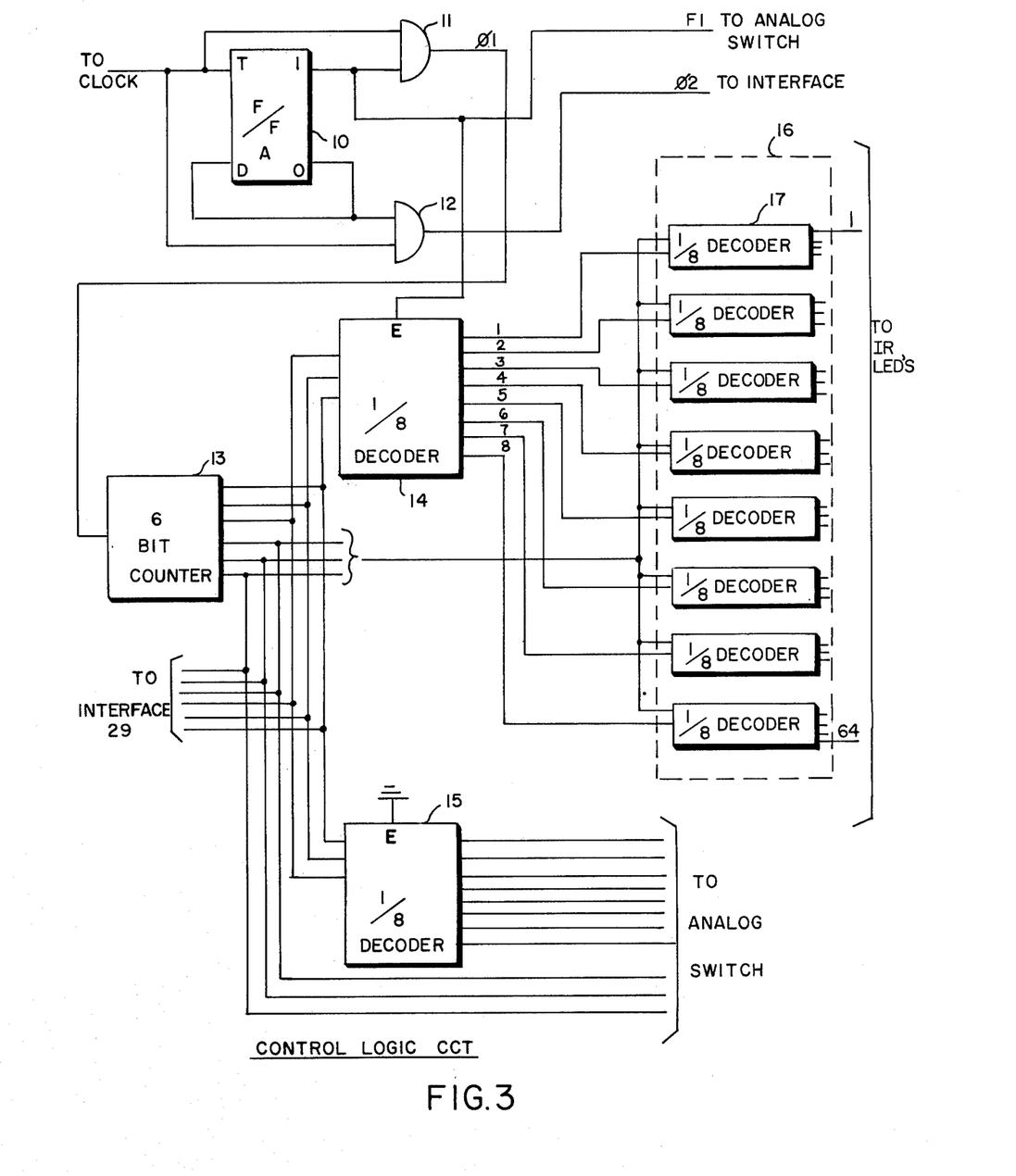
FIGS. 3 and 4 show a block diagram schematic of our invention.
Figure 4:
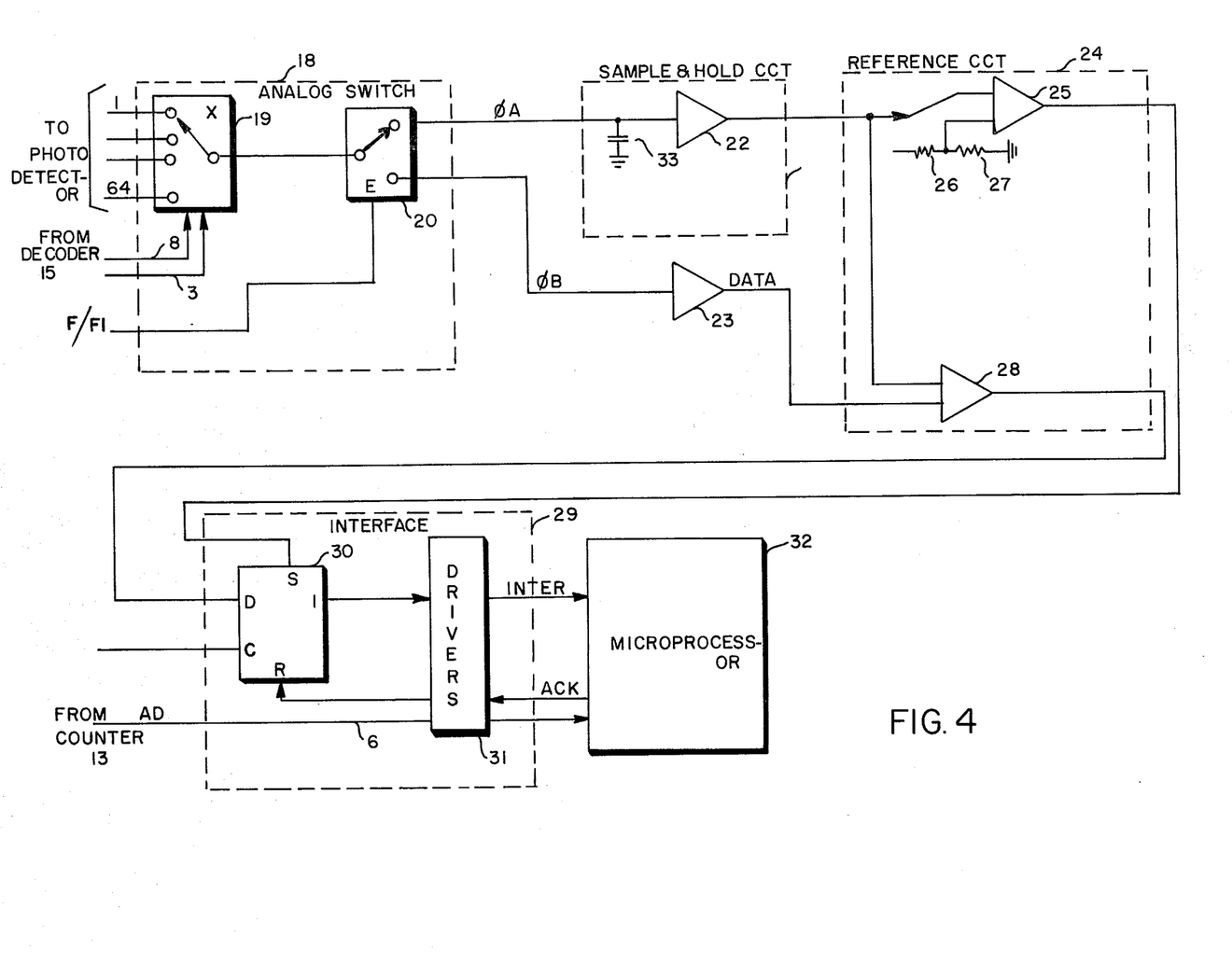
Figure 5:
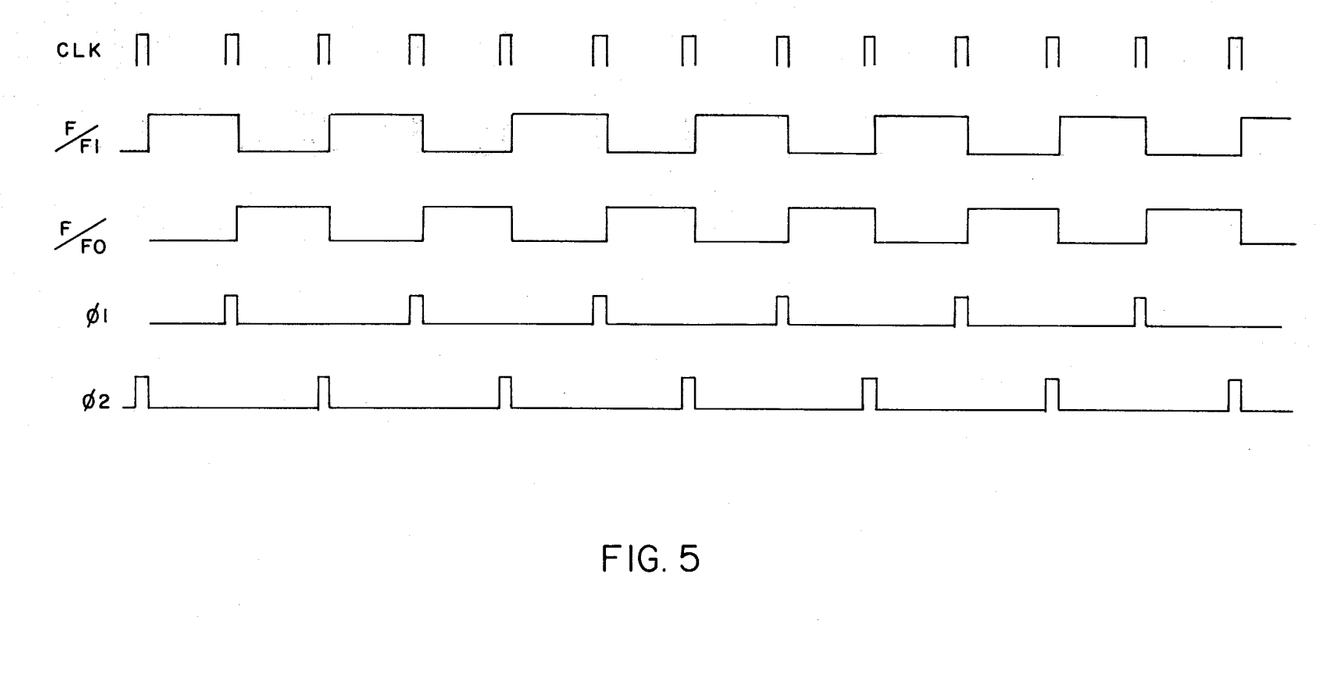
FIG. 5 is a timing diagram of signal waveforms in our invention.

In FIGS. 3 and 4 are shown the detailed block diagram of our invention. In FIG. 3 an oscillator/clock (not shown), well known in the art, is used in conjunction with flip-flop 10 and logic gates 11 and 12 to generate timing signals used to drive the digital circuitry of our invention. The clock signal applied to flip-flop 10, and logic gates 11 and 12 is shown as signal CLK in FIG. 5. Clocking signal CLK has a period of 0.5 milliseconds. Initially, flip-flop 10 is in its zero state with its zero output being high, and this output is connected to the D input of the flip-flop as well as to AND gate 12. The next clock pulse which is applied to toggle input T of flip-flop 10 causes the flip-flop to go to its one state due to the D input being high. The one output of flip-flop 10 is now high, while the zero output, which is coupled around to the D input, is now low. Upon the next clock pulse being applied to toggle input T, flip-flop 10 will be returned to its zero state because its D input is low at this time. The result of the operation of flip-flop 10 is shown in FIG. 5 with the one output signal waveform being shown as F/F1 and the zero output signal waveform being shown as F/F0. It can be seen that the output signals of the one and zero outputs of flip-flop 10 are mirror images of each other and have a period of 1 millisecond. As may be seen in FIG. 3, the one output of flip-flop 10 is one of the two inputs to AND gate 11, while the zero output of the flip-flop is one of the two inputs of AND gate 12. The second input to each of gates 11 and 12 is the clock input. The output of AND gate 11 is the signal $\phi$ shown in FIG. 5 while the output of AND gate 12 is the signal $\phi 2$ shown in FIG. 5. The period of both signals $\phi 1$ and $\phi 2$ is 1 millisecond and these two signals are 0.5 milliseconds out of phase with each other. Signals $\phi 1$ and $\phi 2$ are used to drive circuits of our invention.

As may be seen in FIG. 3, signal $\phi 1$ is input to six bit counter 13 which counts in binary fashion and provides a six bit binary number on its output leads. The three lower order bits of the six bit binary number output from counter 13 are input to both one-out-of-eight ($\frac{1}{8}$) decoder 14 and one-out-of-eight ($\frac{1}{8}$) decoder 15 as shown. Decoders 14 and 15 respond to the three bit binary number input to them to sequentially provide a signal on one out of the eight leads output from each of these circuits. With respect to decoder 14 the eight output leads are used to sequentially select one of the total of eight of one-out-of-eight ($\frac{1}{8}$) decoders 17 within decoder 16. The three lower order bits output from six bit decoder 13 are applied to each of the decoders 17 within decoder 16. The result is that each of decoders 17 is sequentially selected and, upon each of decoders 17 being selected, their eight output leads are individually and sequentially energized. The end result is that the sixty-four total output leads from decoder 16 are individually and sequentially energized for 0.5 millisecond periods beginning with each $\phi 1$ pulse and in approximate synchronism with the F/F0 signal.

As mentioned heretofore, the sixty-four infrared light emitting diodes are distributed around the left, bottom and right edges of the CRT face with twenty LEDs being located on the left side of the screen, twenty-four LEDs being located along the bottom edge of the screen and twenty LEDs being located along the right side of the screen. All of the LEDs are uniformly spaced along their respective sides of the face of the CRT. Each of the sixty-four LEDs located around the edge of the CRT face is connected to a corresponding one of the sixty-four ouput leads from decoder 16 in FIG. 3. In this manner, decoder 16 is able to periodically and sequentially energize each of the infrared LEDs around the three edges of the CRT. Particularly, output leads 1–24 from decoder 16 sequentially energize each of the twenty-four LEDs located on the bottom edge of the CRT, while leads 25–44 sequentially energize the LEDs along the left hand edge of the screen and output leads 45–64 from decoder 16 sequentially energize the twenty LEDs along the right hand edge of the CRT screen. As mentioned previously, there is an LED energized during each one state of the signal represented in FIG. 5 as F/F0. This is during the second half of each one millisecond period, the first half of which is during each one state of F/F1.

In FIG. 3, decoder 15 has the three higher order bits output from counter 13 input thereto and alike decoder 14, decoder 15 sequentially and periodically energizes each of its eight output leads which are connected to analog switch 18 shown in FIG. 4. The three lower order bits output from counter 13 are also connected to analog switch 18. Particularly, the last-mentioned total of eleven leads input to selector switch 19 within analog switch 18. Selector switch 19 responds to these signals to sequentially select one-out-of-sixty-four inputs thereto and connect the selected input to its output which is wired to switch 20 as shown. As noted in FIG. 4, the sixty-four inputs to selector switch 19 are connected to individual ones of the photo detectors located around the edge of the CRT face. The control signals input to switch 19 cause the switch to periodically and sequentially step at a 1 millisecond rate to connect ones of the photo detectors through to switch 20 for a 1 millisecond period. Switch 19 operates such that as an infrared LED is energized its corresponding photo detector is being connected through to switch 20.

During the 1 millisecond period in which each photo detector is connected to the input of switch 20 the switch is operated to connect the input through to its outputs $\phi A$ and $\phi B$ for 0.5 millisecond periods each. This is done under the control of the F/F1 signal applied to control input E from the one output of flip-flop 10 in FIG. 3. In this manner, the detector signal input to switch 20 is switched between its two outputs for 0.5 milliseconds apiece. During the first 0.5 milliseconds of each 1 millisecond period switch 20 switches the input signal to its output $\phi A$ to sample and hold circuit 21. Circuit 21 is made up of amplifier 22 and capacitor 33 in a manner well known in the art and stores samples of the signals input thereto and provides an output corresponding to the samples. During this first 0.5 milliseconds the LED corresponding to the photo detector connected to switch 20 is not operated and the only signal received by the photo detector, and input to sample and hold circuit 21 is due to ambient light. The output of sample and hold circuit 21 is input to reference circuit 24 as shown. In particular, the output of circuit 21 is applied to comparators 25 and 28. Comparator 25 has two inputs, the second input of which is connected to a voltage divider circuit comprising resistors 26 and 27 which divide voltage V as shown. The purpose of comparator 25 is to monitor the output from sample and hold circuit 21 to determine when the ambient light condition exceeds a predetermined level set by the voltage divider. When the ambient level is too high, there is an output from comparator 25 to the set input S of flip-flop 30 in interface circuit 29 which maintains this flip-flop in its one state for the duration of the time that the ambient level is too high.

During the second 0.5 milliseconds of each one millisecond period the control input E of switch 20 is high and a photo detector is connected via lead $\phi B$ and amplifier 23 to comparator 28 which compares the photo detector data signal on lead $\phi B$ with the output of the sample and hold circuit 21. Upon a finger or other object being placed against the screen of the CRT to interrupt an infrared beam, the output of the corresponding photo detector goes high, except for the ambient light level, and this high signal, which is present on lead φB, is inverted at comparator 28 and applied to input D of flip-flop 30 in interface circuit 29. While input D is low and the φ2 clock signal appears at clocking input CL of flip-flop 30, the flip-flop is placed in its zero state indicating an interrupted light beam. The one output of flip-flop 30 is applied via a driver amplifier 31 to microprocessor 32 which interprets the low signal as an interrupted beam and then supplies an acknowledgement signal via lead ACK to the reset input R of flip-flop 30 to return the flip-flop to its one state. In order for microprocessor 32 to know which infrared light beam is interrupted as indicated by the low signal output from flip-flop 30, the six bit binary number output from counter 13 in FIG. 3 is applied via driver amplifier 31 to microprocessor 32. From the address information and beam interrupt information input to microprocessor 32, microprocessor 32 identifies three infrared light beams which are interrupted by a finger or other object during each sixty-four microsecond period in which all the light emitting diodes are scanned.

From the interrupt information input to microprocessor 32, the microprocessor first determines which of the twenty-four vertical infrared beams is interrupted and uses this information to determine which interrupt address for the two interrupted horizontal infrared beams should be utilized. If the infrared beam for vertical oriented LEDs 1–12 is interrupted, the microprocessor knows that the object interrupting the beam is touching the left half of the CRT face. Similarly, if the infrared beam of LEDs 13–24 is interrupted, microprocessor 32 knows that the object interrupting the beam is touching the right half of the CRT face. As previously described, the two horizontal interrupted infrared beams are generated by an LED source at each of the left and right hand edges of the CRT face. To minimize parallax errors, microprocessor 32 will only utilize or consider the infrared beam originating from the left edge of the CRT face when the interrupted vertical beam originates from LEDs 1–12; and microprocessor 32 will only consider the infrared beam originating from the right hand edge of the CRT face when the interrupted vertical beam originates from one of LEDs 13–24.

Once microprocessor 32 determines which interrupted horizontal beam to consider, it utilizes the clock information input thereto from counter 13 in FIG. 3, for the interrupted vertical beam and the selected interrupted horizontal beam to calculate the address of the point on the CRT face which is being touched by a finger or other object. Microprocessor 32 then uses this point address to perform various functions. The information displayed at the point touched may indicate a command to be executed and microprocessor 32 then causes the command to be executed. The procedure may be a bit more complicated whereby the first point touched on a screen may indicate a given type of processing to be performed on information displayed at a second point to be touched on the CRT face. Many variations may be implemented limited only by the programming of microprocessor 32. Another function that may be accomplished is to perform a display inversion upon the point touched. In this case, for example, light alpha-numeric characters may normally appear on a dark background and, upon touching the point, the point or a predetermined area of the screen is inverted such that black letters are displayed on a white background to indicate to the operator by visual feedback which point is being processed by the microprocessor.

The following program listing is the program put into microprocessor 32 to implement the invention and is written in assembly language, which is well known in the art. The program is input via an 8080 assembler to an 8080 microprocessor coupled with sufficient memory. Descriptive headings are provided throughout the program listing to identify sub-routines that implement the various functions of the program. These functions are described hereinabove in this specification.

```
                        ;NOW START OF TIPS PROGRAM
                        ;
                        ORG 0C000H
C000 00                 START: NOP ;SET SPACE FOR FF' TO FOOL POLY MONITOR
C001 CD 08 C0                  CALL SETUP
C004 FB                        EI
C005 CD 1C C8                  JMP TITL
C008 21 20 C9           SETUP: LXI H,PARL ;STORE ADDRESS OF PARALLEL PORT
                                       HANDLER IN WORMHOLE
C00B 22 12 0C                  SHLD SRA2 ;INTERRUPT ADDRESS
C00E 21 BE CA                  LX1 H,OFF ;SET RETURN ADDRESS TO TURN OFF TEST
                                       INTERRUPT
C011 22 14 0C                  SHLD SRA3
C014 00                        NOP
C015 22 10 0C                  SHLD SRA1
C018 3E FF                     MVI A,0FFH ;CLEAR FLAGS
C01A 32 0C 0C                  STA KBUFF ;CLEAR KEY BOARD BUFFER FLAGS
C01D 32 0D 0C                  STA KBUFF+1
C020 32 8D 0C                  STA MBUFF ;CLEAR MOBLE INPUT BUFFER
C023 32 8E 0C                  STA MBUFF+1
C026 21 00 2F                  LX1 H,SA ;PUT A 0 AT BEGINNING OF SPARE STACK
C029 36 00                     MVI M,0
C02B 21 80 0C                  LXI H,PBUFF ;CLEAR BUFFER TABLE
C02E 06 0C                     MVI B,0CH ;SET COUNTER
C030 77                 STA1: MOV M,A
C031 23                        INY H
C032 05                        DCR B
C033 C2 30 C0                  INZ STA1
C036 CD 86 C8                  CALL CLEAR ;WRITE SPACE CODES IN MOBILE REFRESH
                                       MEMORY
C039 CD 0C CA                  CALL INIT ;CLEAR ACID STACK
C03C CD 86 C8                  CALL CLEAR ;CLEAR DISPLAY MEMORY
C03F C9                        RET
C040 CD 86 C8           ST2: CALL CLEAR
```

-continued

| | |
|---|---|
| C043 CD E9 C6 | CALL FORM ;SET DISPLAY FORMAT |
| C046 CD 86 C7 | CALL FIX ;SUBROUTINE TO PUT FIXES IN DISPLAY PATERN |
| C049 CD BF C7 | CALL WORK ;PUT WORDS INTO FIXED DISPLAY |
| C04C CD 55 CA | CALL ACID ;INITIALIZE ACID DISPLAY |
| C04F C9 | RET |
| | ;INSTRUCTION DECODE THIS PART OF THE PROGRAM WILL DECODE THE |
| | ;DIFFERENT KEYBOARD INPUT COMMANDS |
| C050 D3 23 | INST: OUT CLRPRT ;CLEAR I/O BUFFERS |
| C052 FB | EI |
| C053 3A 0C 0C | LDA KBUFF ;GET KB STATUS |
| C056 B7 | ORA A ;SET FLAGS |
| C057 CC 6B C0 | CZ KEYIN |
| C05A 3A 80 0C | LDA PBUFF ;GET PARALLEL INPUT STATUS |
| C05D B7 | ORA A ;SET FLAGS |
| C05E CC E4 C0 | CZ PARIN |
| C061 3A 8D 0C | LDA MBUFF ;GET THE MOBLE INPUT FLAG |
| C064 B7 | ORA A ;SET THE STATUS FLAGS |
| C065 CC D9 CA | CZ MOBILE ;CALL MOBILE INPUT HANDLER |
| C068 C3 50 C0 | JMP INST ;RETURN IF NO INPUT |
| | ; |
| | ; |
| | ; |
| | ;PARIN THIS ROUTINE WILL CONTROL THE PROCESS OF DECODING |
| | ;AND EXECUTITING THE DESIRED TOUCH ENTRY COMMAND |
| | ; |
| C0E4 CD AE C8 | PARIN: CALL PDEC ;DECODE PARALLEL INPUT |
| C0E7 21 88 0C | LXI H,PDON ;CHECK DONE FLAG NEED THREE INPUTS |
| C0EA B7 | ORA A ;SET FLAGS |
| C0EB C0 | RNZ ;NOT DONE RETURN |
| C0EC CD 61 C1 | CALL CMD ;COMMAND DECODE ROUTINE |
| C0EF C8 | RZ ;NOT VALID COMMAND ZERO FLAG SET |
| | ;COMMANDS RETURNED IN THE COMMAND BUFFER (BCMD) |
| | ; XLGC =01 XTRC =02 XLCL =03 TERM =04 |
| | ; A =05 B =06 LFPL =07 LFPG =08 |
| | ; CANCEL=80 NO COMMAND IF =FF AND ZERO FLAG SET |
| C0F0 3A 8C 0C | LDA BCMD ;CHECK FOR CANCEL COMMAND |
| C0F3 FE 80 | CPI 80H |
| C0F5 C2 2E C1 | JNZ PAR1 ;IF CANCEL COMMAND FOUND OR END OF COMM ENTER HERE |
| | ;REMOVE THE INVERSE VIDEO FLAGS |
| | ;AND CLEAR THE COMMAND BUFFER |
| C0F8 2A 90 0C | PCLR: LHLD INV1 ;GET THE INVERSE VIDEO POINTERS AND CLEAR THE INVERSE VIDEO FLAGS |
| C0FB 3E A0 | MVI A,0A0H |
| C0FD 77 | MOV M,A |
| C0FE 21 FF F7 | LXI H,0F7FFH ;CLEAR THE FIRST INVERSE VIDEO FLAG |
| C101 22 90 0C | SHLD INV1 |
| C104 2A 92 0C | LHLD INV2 |
| C107 77 | MOV M,A |
| C108 21 FF F7 | LXI H, 0F7FFH ;CLEAR THE SECOND INVERSE VIDEO FLAG |
| C10B 22 92 0C | SHLD INV2 |
| C10E 2A 94 0C | LHLD INV3 |
| C111 77 | MOV M,A |
| C112 21 FF F7 | LXI H,0F7FFH |
| C115 22 94 0C | SHLD INV3 |
| C118 2A 96 0C | LHLD INV4 |
| C11B 77 | MOV M,A |
| C11C 21 FF F7 | LXI H,0F7FFH |
| C11F 22 96 0C | SHLD INV4 |
| C122 21 8C 0C | LXI H,BCMD ;CLEAR THE COMMAND BUFFER |
| C125 36 FF | MVI M,0FFH |
| C127 CD 55 CA | CALL ACID ;DISPLAY THE UPDATED ACID TABLE |
| C12A D3 23 | OUT CLRPRT ;CLEAR I/O BUFFERS |
| C12C FB | EI |
| C12D C9 | RET ;RETURN TO MAIN PROGRAM |
| | ; |
| | ;VALID COMMAND RECEIVED NOW GO EXECUITE THE SUBROUTINE |
| | ;THAT PREFORMES THE COMMAND |
| C12E 21 49 C1 | PAR1: LXI H,JTAB ;SET HL POINTERS TO THE JUMP TABLE |
| | ; |
| | ;THIS SUBROUTINE LOOKS AT THE PARALLEL INPUT AND DETERMINES |
| | ;WEATHER IT IS VERTICAL, OR HORIZONTAL INPUT AND STORES |
| | ;IT IN THE CORRECT INPUT BUFFER. IT ALSO SETS THE BUFFER FLAGS |
| C8AE 21 80 0C | PDEC: LXI H,PBUFF ;SET POINTER |
| C8B1 23 | PDEC1: INX H |

-continued

| | |
|---|---|
| C8B2 7E | MOV A,M ;GET DATA |
| C8B3 2B | DCX H |
| C8B4 36 FF | MVI M,0FFH ;CLEAR FLAG |
| | ;NOW IS DTAT VERTICAL INPUT, RIGHT HORIZ, OR LEFT HORIZ. |
| | ;STORE DATA IN CORRECT BUFFER AFTER DICISION |
| C8B6 FE 18 | CPI 18H ;CHECK FOR VERTICAL |
| C8B8 FA EF C8 | JM VINP ;BRANCH IF VERTICAL |
| C8BB 47 | MOV B,A ;SAVE DATA |
| C8BC 3A 86 0C | LDA VPOI ;GET VERT FLAG |
| C8BF B7 | ORA A ;SET FLAGS |
| C8C0 C0 | RNZ ;IF NO VERT DATA RET |
| C8C1 78 | MOV A,B ;RETURN DATA |
| C8C2 FE 2A | CPI 2AH ;CHECK FOR RIGHT HORIZ. |
| C8C4 FA DD C8 | JM RIGHT |
| C8C7 21 84 0C | LEFT: LXI H,LPOI ;SET LEFT POINTER |
| C8CA 47 | MOV B,A ;SAVE INPUT |
| C8CB 7E | MOV A,M |
| C8CC B7 | ORA A ;SET STATUS FLAGS |
| C8CD CA FF C8 | JZ END1 ;ALREADY HAVE A RIGHT INPUT |
| C8D0 00 | NOP |
| C8D1 00 | NOP |
| C8D2 34 | INR M ;SET FLAG |
| C8D3 23 | INX H ;INCREMENT POINTER |
| C8D4 78 | MOV A,B |
| C8D5 DE 2B | SBI 2BH ;CORRECT ADDRESS TO THE LIGHT NUMBER |
| C8D7 77 | MOV M,A ;STORE LIGHT NUMBER IN BUFFER |
| C8D8 C3 FF C8 | JMP END1 |
| C8DB 00 | NOP |
| C8DC 00 | NOP |
| C8DD 21 82 0C | RIGHT: LXI H,RPOI ;GET RIGHT POINTER |
| C8E0 47 | MOV B,A ;SAVE DATA |
| C8E1 7E | MOV A,M ;GET FLAG FROM MEMORY |
| C8E2 B7 | ORA A ;SET STATUS FLAGS |
| C8E3 CA FF C8 | JZ END1 ;ALREADY HAVE A RIGHT INPUT |
| C8E6 34 | INR M ;SET FLAG |
| C8E7 23 | INX H ;INCREMENT POINTER |
| C8E8 78 | MOV A,B |
| C8E9 DE 19 | SBI 19H ;CORRECT ADDRESS TO THE LIGHT NUMBER |
| C8EB 77 | MOV M,A ;STORE LIGHT NUMBER |
| C8EC C3 FF C8 | JMP END1 |
| C8EF 21 86 0C | VINP: LXI H,VPOI ;GET POINTER |
| C8F2 00 | NOP |
| C8F3 00 | NOP |
| C8F4 47 | MOV B,A ;SAVE DATA |
| C8F5 7E | MOV A,M ;GET FLAG |
| C8F6 B7 | ORA A ;SET STATUS FLAGS |
| C8F7 CA FF C8 | JZ END1 ;ALREADY HAVE VERTICAL DATA |
| C8FA 00 | NOP |
| C8FB 00 | NOP |
| C8FC 34 | INR M ;SET FLAG |
| C8FD 23 | INX H ;INCREMENT POINTER |
| C8FE 70 | MOV M,B ;STORE INPUT |
| C8FF 21 82 0C | END1: LXI H,RPOI ;GET POINTER |
| C902 00 | NOP |
| C903 00 | NOP |
| C904 7E | MOV A,M ;GET FLAG |
| C905 B7 | ORA A ;SET STATUS FLAGS |
| C906 C2 1F C9 | JNZ DONE ;NOT SET JUMP |
| C909 00 | NOP |
| C90A 00 | NOP |
| C90B 23 | INX H ;INCREMENT POINTER |
| C90C 23 | INX H |
| C90D 7E | MOV A,M ;GET FLAG |
| C90E B7 | ORA A ;SET STATUS FLAGS |
| C90F C2 1F C9 | JNZ DONE ;NOT SET JUMP |
| C912 23 | INX H ;INCREMENT POINTER |
| C913 23 | INX H |
| C914 7E | MOV A,M ;GET FLAG |
| C915 B7 | ORA A ;SET STATUS FLAGS |
| C916 C2 1F C9 | JNZ DONE ;JUMP IF NOT SET |
| C919 23 | INX H ;INCREMENT POINTER |
| C91A 23 | INX H |
| C91B 36 00 | MVI M,00 ;SET PARALLEL INPUT BUFFER FULL FLAG |
| C91D 00 | NOP |
| C91E 00 | NOP |
| C91F C9 | DONE: RET |
| | ; |
| | ;PARALLEL INPUT INTERRUPT HANDELER |
| | ;IT PUTS THE INPUT DATA INTO PBUFF+1 AND SETS THE PARALLEL |
| | ;INPUT FLAG. PBUFF=0 DATA READY, PBUFF=FF |

-continued

```
                    DATA NOT READY
C920 21 80 0C       PARL: LXI H,PBUFF ;SET POINTER
C923 DB 20          IN PORT ;READ THE INPUT DATA
C925 47             MOV B,A; SAVE THE DATA
C926 E6 3F          ANI 3FH
C928 FE 17          CPI 23 ;NOT A VALID INTR
C92A CA 64 00       JZ IORET
C92D FE 3C          CPI 60 ;INTER OVER 59 NG
C92F F2 64 00       JP IORET
C932 00             NOP
C933 00             NOP
C934 7E             MOV A,M ;GET POINTER
C935 B7             ORA A ;SET FLAGS
C936 78             MOV A,B ;GET THE DATA IN A
C937 CA 41 C9       JZ FULL ;IF BUFFER STILL FULL RETURN
C93A 36 00          MVI M,0 ;SET PARALLEL INPUT FLAG
C93C 23             INX H ;INCREMENT POINTER
C93D E6 3F          ANI 3FH ;MASK OFF THE UPPER BITS
C93F 77             MOV M,A ;STORE INPUT DATA
                    ;
C644 00             NOP
                    ;ACDEC THIS ROUTINE WILL TALE THE PARALLEL INPUT
                        DATA
                    ;AND CHANGE IT INTO AN ACID CODE
                    ;    LDEP1 =01    LDEP2 =02    LDEP3 =03
                    ;    LARR1 =11    LARR2 =12    LARR3 =13
                    ;    GDEP1 =09    GDEP2 =0A    GDEP3 =0B
                    ;    GARR1 =19    GARR2 =1A    GARR3 =1B
                    ;IF COMMAND INPUT BUT NOT A CANCEL THEN RETURN
                        WITH NO DATA
                    ;IF CANCEL OR NOT A VALID ACID RETURN WITH ZERO
                        FLAG SET
                    ;IF ACID RETURN WITH ACID CODE IN A REG
                    ;
C645 3A 87 0C       ACDEC: LDA VPOI+1 ;READ THE VERTICAL INPUT
C648 FE 03          CPI 03
C64A FA 7B C6       JM LFDCMD
C64D FE 09          CPI 09 ;SEE IF INPUT FROM LEFT PART OF SCREEN
C64F FA 88 C6       JM ACDEP ;JUMP IF DEPARTING ACID
C652 FE 0D          CPI 0DH ;CHECK FOR COMMAND INPUT
C654 FA 5A C6       JM ACDCMD ;JUMP IF COMMAND INPUT
C657 C3 90 C6       JMP ACARR ;MUST BE FROM RIGHT PART OF SCREEN
C65A 3A 83 0C       ACCMD: LDA RPOI+1 ;CHECK FOR CANCEL COMMAND
C65D FE 06          CPI 06
C65F CA 76 C6       JZ ACDCAN ;JUMP IF CANCEL
C662 FE 07          CPI 07
C664 CA 76 C6       JZ ACDCAN ;JUMP IF CANCEL
C667 FE 0E          CPI 0EH
C669 CA 76 C6       JZ ACDCAN ;JUMP IF CANCEL
C66C FE 0F          CPI 0FH
C66E CA 76 C6       JZ ACDCAN ;JUMP IF CANCEL
                    ;NOT CANCEL MUST BE STILL IN THE COMMAND MODE
                    ;SET NO DATA ENTRY AND RETURN
                    MVI A,0 ;NO DATA
C671 3E 00          JMP ACDEND ;JUMP TO END
C673 C3 D9 C6       ACDCAN: MVI A,80H ;SET CANCEL COMMAND
C676 3E 80          JMP ACDEND ;JUMP TO END
C678 C3 D9 C6       LFDCMD: LDA LPOI+1 ;CHECK FOR LFD COMMD
C67B 3A 85 0C       CPI 06
C67E FE 06          JZ ACDEC7 ;STILL LFD COMMD,RETURN
C680 CA D7 C6       CPI 0EH
C683 FE 0E          JZ ACDEC7
C685 CA D7 C6       ACDEP: MVI B,00 ;SET THE DEPARTING FLIGHT BIT
C688 06 00              BIT 4=0
C68A 3A 85 0C       LDA LPOI+1 ;USE THE LEFT INPUT DATA
C68D C3 95 C6       JMP ACDEC1
     CA8080 Version 4(36)   TIPS.LST=TIPS.SOU 06/26/78 @1422
        PAGE 3-16
C690 06 10          ACARR: MVI B,10H ;SET THE ARRIVING FLAG BIT 4 =1
C692 3A 83 0C       LDA RPOI+1 ;USE THE RIGHT INPUT DATA
C695 FE 02          ACDEC1: CPI 02 ;CHECK FOR THE H2 LOCAL 1
C697 C2 A0 C6       JNZ ACDEC2
C69A 3E 01          MVI A,01 ;SET LOCAL 1 FLAG
C69C B0             ORA B ;APPEND IN THE REST OF COMMAND
C69D C3 D9 C6       JMP ACDEND
C6A0 FE 03          ACDEC2: CPI 03 ;CHECK FOR H3 LOCAL 2
C6A2 C2 AB C6       JNZ ACDEC3
C6A5 3E 02          MVI A,02
C6A7 B0             ORA B ;SET LOCAL 2 FLAG
C6A8 C3 D9 C6       JMP ACDEND
C6AB FE 04          ACDEC3: CPI 04 ;CHECK FOR LOCAL 3 H4
C6AD C2 B6 C6       JNZ ACDEC4
```

-continued

```
C6B0 3E 03        MVI A,03
C6B2 B0           ORA B ;SET LOCAL 3 FLAG
C6B3 C3 D9 C6     JMP ACDEND
C6B6 FE 0A        ACDEC4: CPI 0AH ;CHECK FOR GROUND 1 H10
C6B8 C2 C1 C6     JNZ ACDEC5
C6BB 3E 09        MVI A,09
C6BD B0           ORA B ;SET GROUND 1 FLAG
C6B3 C3 D9 C6     JMP ACDEND
C6C1 FE 0B        ACDEC5: CPI 0BH ;CHECK FOR GROUND 2 H11
C6C3 C2 CC C6     JNZ ACDEC6
C6C6 3E 0A        MVI A,0AH
C6C8 B0           ORA B ;SET GROUND 2 FLAG
C6C9 C3 D9 C6     JMP ACDEND
C6CC FE 0C        ACDEC6: CPI 0CH ;CHECK FOR GROUND 3 H12
C6CE C2 D7 C6     JNZ ACDEC7
C6D1 3E 0B        MVI A,0BH
C6D3 B0           ORA B ;SET GROUND 3 FLAGS
C6D4 C3 D9 C6     JMP ACDEND
C6D7 3E 00        ACDEC7: MVI A,00H ;NOT A VALID ACID
C6D9 4F           ACDEND: MOV C,A ;SAVE ACID CODE A MOMENT
C6DA 21 82 0C     LXI H,RPOI ;CLEAR PARALLEL INPUT TABLE
C6DD 3E FF        MVI A,0FFH
C6DF 06 07        MVI B, 07H ;SET COUNTER
C6E1 77           ACEND1: MOV M,A
C6E2 23           INX H
C6E3 05           DCR B
C6E4 C2 E1 C6     JNZ ACEND1
C6E7 79           MOV A,C ;GET ACID CODE BACK
C6E8 C9           RET ;RETURN WHEN DONE
                  ;
```

We claim:

1. Interactive video display apparatus functioning with a video display having a non-planar display area and with associated equipment which generates signals for a display on said display area comprising:
   a plurality of energy sources located along the edge of the display area of said video display and energized to send beams of energy proximate to at least a portion of said display area;
   a plurality of detectors located along the edge of the display area but being spaced further therefrom than said plurality of energy sources, each of said detectors receiving at least one energy beam and providing an indication upon the received energy beams being interrupted and wherein an object touching the video display interrupts more than two energy beams at least one of which is close to the surface of said display at the point touched;
   means responsive to the interrupted beam indication from ones of said detectors for providing identity signals indicating which energy beams are interrupted; and
   means for processing said identity signals to choose the interrupted energy beams closest to the surface of said display area at the point touched, the identity signals of the chosen interrupted beams defining the coordinates of the video display point being touched.

2. The interactive video display apparatus of claim 1 wherein said identity signal providing means comprises:
   means for periodically sampling the output of each of said detector means to determine the ambient light conditions around said video display detected by said detector means; and
   means for determining if the ambient light conditions are so bright as to interfere with the operation of said interactive video display apparatus, and when said ambient light conditions are too bright providing a signal to said processing means which causes no further processing of said identity signals.

3. The invention in accordance with claim 2 further comprising:
   a counter driven by a clock source;
   a decoder responsive to said counter and having an output associated with each of said energy sources, said decoder outputs being sequentially and periodically energized to energize said energy sources; and
   a first selector having an output associated with each of said detectors sequentially and periodically connecting each of said detectors to an output of said first selector, each of said detectors being connected to said first selector output for a first time period during part of which their associated energy sources are energized.

4. The invention in accordance with claim 3 wherein said first selector connects a selected detector to said sampling means for part of said first time period and to said identity signal providing means for the remainder of said first time period during which its associated energy source is energized.

5. The invention in accordance with claim 4 wherein plurality of energy sources each comprise a device for emitting infrared when energized.

6. Interactive video display apparatus functioning with a video display device having a non-planar display area and with associated equipment which generates signals for a display on said display area, comprising:
   a first plurality of energy sources located along the edge of the display area of said video display and energized to send beams of energy relatively close to at least a portion of the surface of said non-planar display area;
   a second plurality of energy sources also located along the edge of the non-planar display area of said video display and energized to send beams of energy close to at least a portion of but not touching the surface of said display area, the beams from said second plurality of energy means not being coplanar with said beams of energy from said first plurality of energy sources;

a third plurality of energy sources also located along the edge of the display area of said video display and energized to send beams of energy close to at least a portion of but not touching the surface of said display area, the beams from said third plurality of energy sources not being coplanar with said beams of energy from said first and said second energy sources, with an energy beam of one each of said first, second and third plurality of energy sources being interrupted upon touching said display area with a finger or other object;

a plurality of detectors with one detector being associated with each energy source of said first, second, and third plurality of energy sources, each detector being located on the opposite side of said display area from its associated one of said first, second or third plurality of energy sources and receiving the energy beam from the associated energy source, said detectors providing an output indication upon the received energy beam being interrupted; and means responsive to said interrupted beam output indication from ones of said detectors upon said display area being touched for providing identity signals indicating which energy beams are interrupted.

7. The invention in accordance with claim 6 further comprising means for processing said identity signals to choose the interrupted energy beams closest to the surface of said display area at the point touched, the chosen interrupted beam identity signals defining the coordinates of the point being touched.

* * * * *